P. THOMAS.
METHOD OF MEASURING CAPACITY AND POWER FACTOR.
APPLICATION FILED DEC. 4, 1913.

1,166,159. Patented Dec. 28, 1915.

WITNESSES:
Clarence E. Myers.
J H Procter

INVENTOR
Phillips Thomas
BY
Willey G. Carr
ATTORNEY

UNITED STATES PATENT OFFICE.

PHILLIPS THOMAS, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF MEASURING CAPACITY AND POWER FACTOR.

1,166,159.   Specification of Letters Patent.   Patented Dec. 28, 1915.

Application filed December 4, 1913. Serial No. 804,755.

*To all whom it may concern:*

Be it known that I, PHILLIPS THOMAS, a citizen of the United States, and a resident of Wilkinsburg, in the county of Allegheny and State of Pennsylvania, have invented a new and useful Improvement in Methods of Measuring Capacity and Power Factors, of which the following is a specification.

My invention relates to electrical measuring systems and particularly to methods of simultaneously measuring the capacity and the power factor of electrical condensers.

The object of my invention is to provide a method of determining the capacity of condenser terminal bushings and the phase relation between the current and voltage in the same when operating at normal frequency and voltage.

Heretofore, various methods have been proposed for determining the electrical capacity of condensers, one of these methods being to charge a condenser with direct current and discharge it through a galvanometer of known characteristics, and another of these methods being to form a Wheatstone bridge having two resistor arms, a standard condenser arm, an unknown condenser arm, a battery, a galvanometer and a sechometer or contact maker for reversing the current. These methods will give approximately correct results for electrical capacities between certain values but they do not give the true operating capacity or power factor which a condenser will have when connected to an alternating current circuit. To overcome this difficulty, I provide a means for measuring the capacity with alternating current, which alone is not new in the art, but I further provide means whereby exceedingly high-resistance resistors of large current-carrying capacity are not required in the arms of the bridge.

Figure 1:
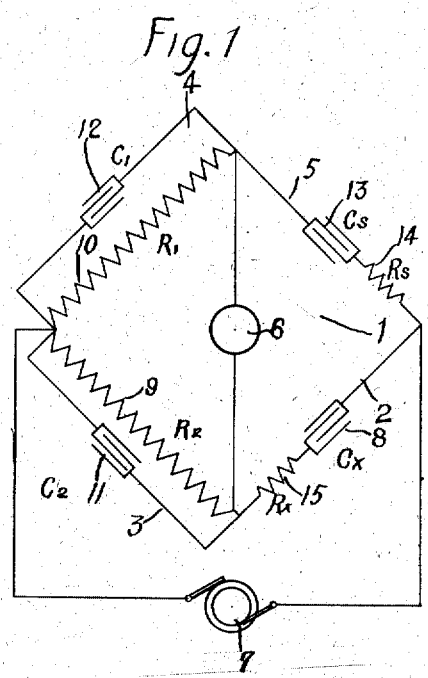
Figure 2:
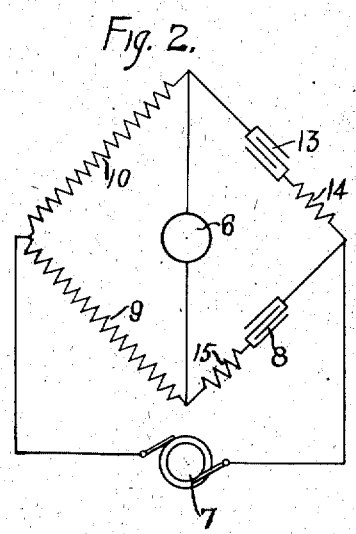
Figure 3:
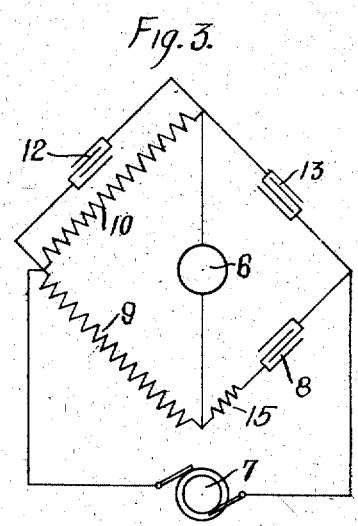

Figure 1 of the accompanying drawing is a diagrammatic view of circuits and apparatus arranged in accordance with a theoretical form of my invention. Fig. 2 is a diagrammatic view of a Wheatstone bridge, and Fig. 3 is a diagrammatic view of a practical arrangement of circuits and apparatus embodying my invention.

Referring to the drawing, a Wheatstone bridge 1 is provided having four arms 2, 3, 4 and 5, a galvanometer 6 and a source 7 of alternating electromotive force. The arm 2 of the bridge 1 consists of an electrical condenser 8, the capacity and power factor of which is to be measured. The arms 3 and 4 respectively comprise resistors 9 and 10 and standard variable-capacity electrical condensers 11 and 12 in shunt relation thereto, and the arm 5 comprises a condenser 13 of known constants. The resistors 14 and 15 are fictitious and represent only the resistance $R^s$ and $R^x$, respectively, of the electrical condensers 13 and 8.

Assume, for the purpose of simplifying the explanation, that the electrical condenser 8 has a capacity $C^x$ and a resistance $R^x$; that the electrical condensers 11 and 12 have capacities of $C^2$ and $C^1$, respectively; that the electrical condenser 13 has a capacity $C^s$ and a resistance $R^s$, and that the resistors 9 and 10 have resistances $R^2$ and $R^1$, respectively.

If a Wheatstone bridge, as shown in Fig. 2, is impressed with an electromotive force of such value and frequency as the electrical condenser 8 will employ in active service, it will require actual resistors 14 and 15 of relatively high resistance and of relatively high current-carrying capacity in order to balance electrical condensers of relatively low electrical capacity and small phase difference, such as are used for condenser bushings. In order not to use actual resistors 14 and 15 of relatively high resistance, I provide variable-capacity electrical condensers 11 and 12 which are respectively connected in shunt relation to the resistors 9 and 10, as shown in Fig. 1.

Referring to Fig. 1; when the bridge is balanced so that the galvanometer does not deflect, no current traverses the galvanometer 6 and the following condition obtains $$\frac{Z_x}{Z_s} = \frac{Z_2}{Z_1} \quad (A)$$

where $Z_x$, $Z_s$, $Z_2$ and $Z_1$ represent the impedances of the respective arms 2, 5, 3 and 4. The following general equations are true:

$$Z_x = R_x + jx_x$$
$$Z_s = R_s + jx_s$$
$$Z_2 = \frac{1}{\frac{1}{R_2} - \frac{j}{x_2}}$$

and $$Z_1 = \frac{1}{\frac{1}{R_1} - \frac{j}{x_1}}$$

where $x_x$, $x_s$, $x_2$ and $x_1$ are the reactances of the respective arms 2, 5, 3 and 4, and $$x_x = \frac{1}{2\pi F C_x}$$
$$x_s = \frac{1}{2\pi F C_s}$$
$$x_2 = \frac{1}{2\pi F C_2}$$

and $$x_1 = \frac{1}{2\pi F C_1}$$

where F is the test frequency. If substitution is made in equation (A) the following equation is derived:

$$R_x + jx_x = \frac{(R_s + jx_s)\left(\frac{1}{R_1} - \frac{j}{x_1}\right)\left(\frac{1}{R_2} + \frac{j}{x_2}\right)}{\frac{1}{R_2^2} + \frac{1}{x_2^2}} \quad (B)$$

and if the real terms from the right and left hand side of this equation are equated, the following equation results:

$$R_x = \frac{\frac{R_s}{R_1 R_2} + \frac{x_s}{x_1 R_2} - \frac{x_s}{R_1 x_2} + \frac{R_s}{x_1 x_2}}{\frac{1}{R_2^2} + \frac{1}{x_2^2}} \quad (C)$$

and if the imaginary terms of equation B are equated, the following equation is derived:

$$x_x = \frac{\frac{R_s}{R_1 x_2} + \frac{x_s}{R_1 R_2} - \frac{R_s}{x_1 R_2} + \frac{x_s}{x_1 x_2}}{\frac{1}{R_2^2} + \frac{1}{x_2^2}} \quad (D)$$

If equation (D) is simplified and rearranged, equation (E) results:

$$\frac{x_x}{x_s} = \frac{C_s}{C_x} = \frac{R_2}{R_1}\left(\frac{R_s}{x_s} \times \frac{x_2 R_2}{R_2^2 + x_2^2} + \frac{x_2^2}{R_2^2 + x_2^2} - \frac{R_s}{x_s} \times \frac{R_1}{x_1} + \frac{x_2^2}{R_2^2 + x_2^2} + \frac{R_1}{x_1} \frac{x_2 R_2}{R_2^2 + x_2^2}\right) \quad (E)$$

which is also equal to $$\frac{R_2}{R_1}(1 - \sin^2 \theta_2 - \tan \theta_1 (\cos^2 \theta_2 \cot \theta_s - \sin \theta_2 \cos \theta_2) + \cot \theta_s \sin \theta_2 \cos \theta_2)$$

from which $C_x$ may be calculated and in which $\theta_1$, $\theta_2$, $\theta_x$ and $\theta_s$ are the angular displacements of the current and voltage in the respective arms 4, 3, 2 and 5.

By dividing equation (D) by (C), arranging the terms and substituting the values of the trigonometric functions $\theta_s$, $\theta_1$ and $\theta_2$, the following ensues:

$$\frac{x_x}{R_x} = \tan \theta_x = \frac{\tan \theta_s (1 + \tan \theta_1 \tan \theta_2) - (\tan \theta_1 - \tan \theta_2)}{\tan \theta_s (\tan \theta_1 - \tan \theta_2) + (1 + \tan \theta_1 \tan \theta_2)}$$

which equals $$\tan(\theta_s - (\theta_1 - \theta_2))$$

but since $$\frac{x_x}{R_x} = \tan \theta_x$$

then $$\theta_x = \theta_s - (\theta_1 - \theta_2) \quad (F)$$

where $\theta_x$ is the phase displacement between the current and potential of the power consumed in a condenser and $\cos \theta_x$ is equal to the power factor of the power consumed.

Since the above mentioned operations are exceptionally complicated to perform mathematically, I have simplified my method by using an electrical condenser 13 having zero power factor and known capacity, and a resistor 9 which has a very small residual capacity; hence the electrical condenser 11 may be omitted and the bridge arranged as shown in Fig. 3, then the equation (E) reduces to $$\frac{x_x}{x_s} = \frac{C_s}{C_x} = \frac{R_2}{R_1} \quad (G)$$

and the equation for (F) reduces to $$\theta_x = \frac{\pi}{2} - \theta_1$$

or $$\tan \theta_x = \cot \theta_1 = \frac{1}{2\pi F C_1 R_1} = \frac{1}{2\pi F C_x R_x} \quad (H)$$

from which the electrical capacity and the power factor may be easily calculated.

In order to reduce the power factor of the electrical condenser 13 to zero, it must be a relatively perfect air condenser thoroughly protected from leakages and external disturbances, and its current must be substantially 90° out of phase with its voltage.

With particular reference to Fig. 3 of the drawings, my method of deriving the electrical capacity and power factor of an electrical condenser is as follows: The electrical condenser 12 is disconnected and the resistors 9 and 10 adjusted until an approximate balance has been obtained, then the electrical condenser 12 is inserted in parallel relation with the resistor 10 and either the resistors 9 and 10 are readjusted or the electrical condenser 12 is varied until a balance is obtained. Since the resistance of the resistor 9 is $R_2$ the resistance of the resistor 10 is $R_1$ and the capacity of the condenser 13 is known to be $C_s$, substitution may be made in equation (G) and the capacity $C_x$ of the unknown electrical condenser 8 may be calculated. To calculate the power factor of the condenser 8, equation (H) is applied, since F is the frequency of the applied voltage wave, $C_1$ is the capacity of the electrical condenser 12, and $R_1$ is the resistance of the resistor 10, as hereinbefore explained.

When comparing condensers of very small capacity, a single determination by the bridge is of little value unless the capacities of the electrical condensers 8 and 13 are approximately equal and unless the arrangement of the bridge is symmetrical with respect to the ground and to the high-potential source 7. Hence, when comparing condensers of very small capacity, it is best to compare each of the condensers the ratio of which is desired with a third or auxiliary condenser, constants of which need not be known. This procedure eliminates the residuals of the bridge from the final result.

Assuming the auxiliary condenser, for convenience, to have a capacity $C_t$ and a phase angle of $\theta_t$, then, with all other values as hereinbefore assumed, the method of procedure for determining the absolute values is as follows: Insert the auxiliary condenser in place of condenser 13 in Fig. 3 and derive a balance. Let the ratio between the capacity of the unknown condenser with the auxiliary condenser be called A, then $$\frac{C_x}{C_t} = A$$

and the phase difference will be $\theta_x - \theta_t = a$, from equation (F). Then, comparing condenser 13 with the auxiliary condenser and calling the ratio B, or $$\frac{C_s}{C_t} = B$$

and the phase difference $\theta_s - \theta_t = b$, from equation (F). Then, combining the above results, $$\frac{C_x}{C_s} = \frac{A}{B}$$

and $$\theta_s - \theta_x = b - a,$$

but, since $\theta_s = 90°$ approximately $$\theta_x = 90° - (b - a),$$

which is an absolute value, but if the results of one test are sufficiently accurate for all practical purposes, the absolute method need not be applied.

While I have described several methods of arranging the arms of a Wheatstone bridge and means for deriving the power factor and capacity of an electrical condenser, I desire it to be understood that my invention is not limited except as defined in the appended claims.

I claim as my invention:

1. A bridge comprising two variable resistance ratio arms, one arm containing a condenser of known capacitance and power factor and one arm containing a dielectric of unknown capacitance and power factor and a condenser connected in shunt relation to one of the ratio arms.

2. A device for measuring the capacitance and power factor of a dielectric comprising a bridge, one arm of which constitutes the dielectric of unknown capacitance and power factor, one arm constitutes a condenser of known capacitance and power factor, two ratio arms and means connected in shunt with the ratio arms for changing the impedance thereof.

3. A Wheatstone bridge comprising a source of electromotive force, a galvanometer, two variable resistors, a condenser of known capacitance and power factor, a dielectric of unknown capacitance and power factor and means connected in shunt relation to one of the variable resistors for changing the balance of the bridge.

4. A device for measuring the capacitance and power factor of a dielectric comprising a Wheatstone bridge having two resistor ratio arms, one additional arm containing the dielectric to be measured, one arm containing a condenser of known capacitance and a condenser connected in shunt relation to one of the said resistor ratio arms.

5. In a Wheatstone bridge, the combination with a source of alternating electromotive force, of a current-indicating instrument, two variable resistor arms, one arm containing an electrical condenser of known capacitance and power factor, one arm containing a dielectric of unknown capacitance and power factor, and an electrical condenser in parallel relation with one of the said resistor arms.

6. The method of measuring the capacitance and power factor of a dielectric that consists in connecting the dielectric in a Wheatstone bridge and deriving an approximate balance by varying the resistance of the ratio and then deriving a correct balance by inserting a condenser in shunt to one of the ratio arms and varying the impedance of that ratio arm and then computing the capacitance and power factor knowing the electrical constants of the bridge.

7. The method of measuring the capacitance and power factor of a condenser under operating conditions that consists in connecting the condenser in a Wheatstone bridge and deriving an approximate balance, then connecting a condenser in parallel with one of the ratio arms and varying the impedance of that arm until a balance is secured, and then computing the capacitance and power factor knowing the constants of the bridge.

In testimony whereof, I have hereunto subscribed my name this 1st day of Dec. 1913.

PHILLIPS THOMAS.

Witnesses:
B. B. Hines,
M. C. Merz.

Correction in Letters Patent No. 1,166,159.

It is hereby certified that in Letters Patent No. 1,166,159, granted December 28, 1915, upon the application of Phillips Thomas, of Wilkinsburg, Pennsylvania, for an improvement in "Methods of Measuring Capacity and Power Factors," an error appears in the printed specification requiring correction as follows: Page 2, line 53, for "+" second occurrence, read $x$; and that the said Letters Patent should be read with this correction therein that the same may conform to the record of the case in the Patent Office.

Signed and sealed this 15th day of February, A. D., 1916.

[SEAL.]

Cl. 175—183.

R. F. WHITEHEAD,
*Acting Commissioner of Patents.*